United States Patent [19]

Tomishima et al.

[11] Patent Number: 5,169,918
[45] Date of Patent: Dec. 8, 1992

[54] POLYMERIZATION APPARATUS HAVING AN EFFECTIVE HEIGHT/EFFECTIVE INNER DIAMETER RATIO OF AT LEAST 4 AND A CIRCUMFERENTIAL AGITATIVE DIAMETER/EFFECTIVE INNER RATIO DIAMETER OF FROM 0.7 TO 0.9

[75] Inventors: Yoshio Tomishima; Kazuo Dairaku; Takekazu Maeda, all of Hyogo; Nobuki Toba; Hideyuki Kametani, both of Osaka; Keizo Hayashi, Hyogo; Mitsumasa Hasegawa, Osaka; Masahiro Tsujinaka, Hyogo, all of Japan

[73] Assignee: Kanegafuchi Kagaku Kogyo Kabushiki Kaisha, Osaka, Japan

[21] Appl. No.: 583,407

[22] Filed: Sep. 17, 1990

[30] Foreign Application Priority Data

Sep. 18, 1989 [JP] Japan .................. 1-241585
Oct. 2, 1989 [JP] Japan .................. 1-257397
May 7, 1990 [JP] Japan .................. 2-118258

[51] Int. Cl.$^5$ ............................................ C08F 2/16
[52] U.S. Cl. .................................. 526/344.2; 526/88
[58] Field of Search .................... 526/344.2, 88

[56] References Cited

U.S. PATENT DOCUMENTS 4,125,574 11/1978 Kastner et al. .
4,220,743 9/1980 Englin .................. 526/62
4,228,268 10/1980 Musha ............... 526/344.2
4,528,337 7/1978 Kreilein et al. .

FOREIGN PATENT DOCUMENTS 0093936 11/1983 European Pat. Off. .
2353574 12/1977 France .
2001659A 2/1979 United Kingdom .

OTHER PUBLICATIONS

*Encyclopedia of PVC*, vol. 1, (2d ed.) pp. 86–91.
*Manufacture and Processing of PVC*, pp. 28–29.

Primary Examiner—Christopher Henderson
Attorney, Agent, or Firm—Armstrong & Kubovcik

[57] ABSTRACT

In a process for the microsuspension or emulsion polymerization of vinyl chloride using a polymerization apparatus equipped with an agitator the improvement where the ratio (H/D) of the effective height (H) of the apparatus to the effective inner diameter (D) of the apparatus is 4 or more.

2 Claims, No Drawings

POLYMERIZATION APPARATUS HAVING AN EFFECTIVE HEIGHT/EFFECTIVE INNER DIAMETER RATIO OF AT LEAST 4 AND A CIRCUMFERENTIAL AGITATIVE DIAMETER/EFFECTIVE INNER RATIO DIAMETER OF FROM 0.7 TO 0.9

FIELD OF THE INVENTION

The present invention relates to a polymerization apparatus and process for the manufacture of vinyl chloride resins, particularly those for use in pastes.

BACKGROUND OF THE INVENTION

Vinyl chloride resins, particularly those for use in pastes, are manufactured by a microsuspension polymerization process or an emulsion polymerization process.

In the microsuspension polymerization process, a monomer consisting of vinyl chloride or containing vinyl chloride as the major component is mixed with water, an emulsifying agent, a polymerization initiator soluble in the monomer, and other polymerization additives by means of high shear in an apparatus other than the polymerization apparatus to form a uniform dispersion. Subsequently the dispersion is transferred to the polymerization apparatus, and then the monomer is polymerized with stirring to yield vinyl chloride resin fine particles having an average particle diameter of about 0.2 to 3 $\mu$m.

Although the dispersed monomer droplets formed in the mixing step are relatively stable because they are protected by the emulsifying agent, the droplets become unstable as the polymerization proceeds and reaches its latter half stage. If agitation during the polymerization is too strong, coalescence of particles resulting from collisions the particles is accelerated, so that the proportion of coarse particles becomes large and the amount of scale deposited on the wall of the polymerization apparatus or on the agitating element is increased, and in an extreme case, coagulation of polymer particles may occur and destroy the latex.

In addition, there are often cases where due to the increase in the amount of coarse particles, the particle diameter distribution is changed, and impairs flow properties, such as sol viscosity, of the product.

Therefore, in practicing the microsuspension polymerization process, low-shear type agitating elements are generally employed during polymerization. For this reason, the heat transfer coefficients of the jackets of the polymerization apparatuses have been low as compared with those for a suspension polymerization process employing vigorous agitation. Hence, the ability to remove heat of polymerization has been rate-determining for the attaining of improved polymerization production efficiency.

As the emulsion polymerization process, emulsion polymerization or seed emulsion polymerization are used. In emulsion polymerization, vinyl chloride monomer is polymerized in an aqueous medium with the aid of an anionic surface active agent and/or a nonionic surface active agent as an emulsifying agent and a water-soluble peroxide, a combination of a water-soluble peroxide and a water-soluble reducing agent, or a combination of an oil-soluble peroxide and a water-soluble reducing agent as a polymerization initiator and, if required, other polymerization additives, to yield vinyl chloride resin fine particles having an average particle diameter of 0.1 to 0.4 $\mu$m. In seed emulsion polymerization, the above-described emulsion polymerization is conducted in the presence of, as seed particles, vinyl chloride resin particles that have been prepared beforehand, and as a result, the seed particles are enlarged to give relatively large particles having particle sizes of 0.4 to 2 $\mu$m.

If the emulsifying agent is present in an excessive amount, very fine particles result. Hence, the emulsifying agent is additionally incorporated in the minimum amount necessary to cover the polymer particles precipitated, so that the particles are extremely unstable during polymerization. Therefore, relatively mild agitation is employed in the emulsion polymerization process as it is in the above-described microsuspension polymerization. It is, therefore, important also for the emulsion polymerization process to improve the ability to remove heat of polymerization in order to increase the production efficiency in the process.

When the microsuspension polymerization process or emulsion polymerization process as described above is carried out batch-wise, tank-type polymerization apparatuses having H/D ratios (where H is the effective height of the polymerization apparatus and D is the effective diameter thereof) of about 1 to 3 are generally used so that sufficient mixing in the upward and downward directions in the apparatuses can be obtained.

Various heat-removing methods have been proposed for such polymerization apparatuses to eliminate the problem concerning heat removal as described above. For example, there are a method in which heat of polymerization is removed by increasing the heat transfer area, a method in which the heat is removed by increasing the total heat transfer coefficient by, for example, changing the materials constituting the polymerization apparatus, or modifying the structure of the jacket and the shape of the agitating element, and a method in which the heat is removed by employing a low-temperature refrigeration medium to give an increased temperature difference.

As means of increasing the heat transfer area, it has been proposed, for example, to pass cooling water through the agitating element and baffles, to use a reflux condenser (JP-A-54-153894 (the term "JP-A" as used herein means an "unexamined published Japanese patent application")), to use an external cooling device (JP-A-55-157607), and to employ a polymerization apparatus equipped with a draft tube (JP-A-55-62908).

However, use of baffles is disadvantageous in that coalescence of particles is accelerated around the agitating element and baffles to increase the amount of coarse particles, and that the apparatus necessarily has a complicated structure, which results in an increase in the amount of scale deposits Use of a reflux condenser in the microsuspension polymerization process is disadvantageous (although it is generally used in the emulsion polymerization process) in that scale deposition occurs due to the foaming of the liquid reactant mixture, and that the pressure increases abnormally and a bulk polymer is generated, due to insufficient introduction of the refluxed vinyl chloride monomer into the reactant mixture. Use of an external cooling device is disadvantageous in that latex is destroyed and the amount of coarse particles is increased due to the high shear in the circulating pump and scales are deposited in the cooling device. Thus, there are various problems to be solved for the practical use of this technique.

Polymerization in a polymerization apparatus equipped with a draft tube is conducted while the liquid reactant mixture is being circulated slowly by means of the draft tube under conditions that cause little turbulent flow, and this apparatus is effective in controlling scale formation. However, it is impossible to completely prevent scale deposition, and scales that are deposited are difficult to remove particularly from the space between the draft tube and the wall of the polymerization apparatus and from the lower part of the agitating element used for circulation. Thus, this polymerization apparatus is not suitable for long-term stable running.

Further, the method of removing heat of polymerization by increasing the total heat transfer coefficient is disadvantageous in that scales are apt to be generated, agitation conditions are limited due to the structure of the apparatus, and the apparatus is costly.

The method of removing polymerization heat by creating a large temperature difference is disadvantageous in that this method is costly because of the increased running cost of providing refrigeration.

With respect to the introduction of a monomer containing vinyl chloride into the polymerization apparatus in emulsion polymerization, the following methods, for example, have been proposed. In the examples of JP-A-57-98511, water and a water-soluble polymerization initiator are first introduced into the polymerization apparatus, the inside of the apparatus is then evacuated, vinyl chloride monomer is introduced, and then the temperature of the reaction mixture is raised to initiate polymerization, with an emulsifying agent being added continuously after the conversion to polymer reaches a certain level.

In JP-A-55-66504, water, a latex of seed polymer particles, and a reducing agent are first introduced into the polymerization apparatus, the inside of the apparatus is subsequently evacuated and vinyl chloride monomer is introduced, and then polymerization is initiated by raising the temperature of the reaction mixture and continuously adding a peroxide, with an emulsifying agent being added after the polymerization has proceeded to some extent.

As in the methods described above, it is common in the emulsion polymerization of vinyl chloride that all of the vinyl chloride monomer is introduced at one time at the beginning of the polymerization.

The emulsion polymerization is initiated when a free radical generated in the aqueous phase reacts with vinyl chloride monomer in the aqueous phase. Polymer particles precipitated are allowed to grow and maintain their predetermined particle diameters by additionally incorporating an emulsifying agent in an amount necessary to cover the polymer particles. The polymer particles (polymer latex particles) formed have a tendency to coagulate and destroy the latex and, if polymerization is conducted with agitation, the amount of scale which adheres to the wall of the polymerization apparatus and the amount of scale floating in the polymer latex are increased with increasing shear force resulting from the agitation. Therefore, the shear force produced by agitation should be restricted during polymerization in order to reduce the amount of such scale, and even if agitation is used during polymerization, it is essential to agitate at a low speed.

For example, the emulsion polymerization process described in JP-B-58-57409 (the term "JP-B" as used herein means an "examined Japanese patent publication") is characterized in that an initiator is introduced into the aqueous phase under such mild agitation conditions that the monomer phase and the aqueous phase are separated into two layers, in order to reduce the amount of scale formed during polymerization.

In the above method, however, mixing in the polymerization apparatus is insufficient because of the mild agitation. Since the rate of polymerization is determined by the rate of migration of the monomer to the aqueous phase, it is difficult to reduce the polymerization time if the agitation is not increased. If the amount of the polymerization initiator is increased in order to reduce the polymerization time, the resulting polymer has an exceedingly lowered average molecular weight. If the number of revolutions of the agitator is increased so as to promote diffusion of the vinyl chloride, there is a problem that the amount of coarse particles and the amount of scale deposits are increased.

Further, emulsion polymerization performed under low-rate agitation conditions causes the polymerization reaction system (the system in which both the monomer and the polymer latex are present) to have a high viscosity, which results in a low heat transfer coefficient at the interface between the polymerization apparatus and the polymerization reaction system and, hence, insufficient heat removal. A further problem is that the removal of heat of polymerization becomes even more difficult if a larger-size polymerization apparatus is employed or the proportion of introduced vinyl chloride monomer introduced into the apparatus is increased.

In order to solve the heat removal problem, it has been proposed to pass a low-temperature brine through the jacket of the polymerization apparatus, or to provide a cooling coil in the polymerization apparatus. However, the former proposal is disadvantageous in that the production cost is increased because of increased power consumption, while the latter proposal is disadvantageous in that deposition of polymer particles occurs on the cooling coil, and this necessitates cleaning to remove the deposited polymer. Thus, neither of these proposals is preferable.

On the other hand, removing heat of polymerization by means of a condenser provided in the gas-phase section of the polymerization apparatus is known in the suspension polymerization of vinyl chloride and in other polymerization processes. This heat-removing technique can generally be employed only where the polymerization reaction system is agitated at a high speed and is in a completely mixed state. According to this technique, vinyl chloride monomer is condensed in the condenser and continuously returned to the part above a surface of the reactant mixture in the polymerization apparatus through a nozzle, as described, for example, in JP-B-58-48561.

However, in the production of vinyl chloride resins for use in pastes, it is impossible to employ high-speed agitation. If, for this reason, emulsion polymerization to produce a vinyl chloride resin is performed under low-speed agitation conditions while the monomer is being condensed and returned to the gas phase by means of a condenser, the result is that the polymerization reaction system is poorly mixed. Also, because of the latent heat of vaporization of the monomer which is present in a large amount in the upper part of the polymerization apparatus, only the upper part of the liquid phase is cooled and a temperature difference arises between the upper and lower parts of the liquid phase. As a result the heat-removing efficiency of the condenser is lowered.

SUMMARY OF THE INVENTION

Accordingly, a first object of the present invention is to provide a high-production-efficiency polymerization apparatus which is excellent in the ability to remove heat of polymerization and in which little deposition of scale and little generation of coarse particles occurs, and which is suited for the microsuspension polymerization or emulsion polymerization process for producing a vinyl chloride resin having good sol viscosity and, particularly, a vinyl chloride resin for use in pastes. It is also an object of the present invention to provide a polymerization process using the above apparatus, thereby eliminating the problems described above.

A further object of the present invention is to provide a highly efficient process for producing a vinyl chloride resin and, particularly, a vinyl chloride resin for use in pastes, by means of emulsion polymerization, in which process generation of coarse particles and deposition of scale can be diminished and polymerization time can be reduced without lowering the average polymerization degree of the vinyl chloride resin produced.

Another object of the present invention is to provide a process for the emulsion polymerization of vinyl chloride monomer which is conducted with low-speed agitation using a polymerization apparatus equipped with a condenser and agitator, in which process a vinyl chloride resin can be produced in a reduced polymerization time without increasing the amount of scale and the heat of polymerization can be removed efficiently by the condenser.

The present inventor has conducted intensive studies of the relationship between some production conditions, i.e., the structure of the polymerization apparatus and polymerization conditions, and scale deposition, the production of coarse particles, the properties of the vinyl chloride resin such as sol viscosity, heat transfer coefficients, etc. As a result, the present invention has been completed.

According to the present invention a polymerization apparatus is provided for use in the microsuspension polymerization or emulsion polymerization of a monomer containing vinyl chloride, which apparatus is equipped with an agitator and in which the ratio (H/D) of the effective height (H) of the apparatus to the effective inner diameter (D) of the apparatus is 4 or more, preferably from 5 to 15.

The microsuspension polymerization and the emulsion polymerization herein mean the respective polymerization processes as described hereinbefore in the background section.

In an especially preferred embodiment of the polymerization apparatus according to a first aspect of the present invention, the ratio, (d/D), of the circumferential diameter (d) of the agitating element of the agitator to the effective inner diameter (D) of the polymerization apparatus is 0.6 or more, preferably from 0.7 to 0.9.

According to a first aspect of the present invention, there is also provided a process for producing a vinyl chloride resin, particularly a vinyl chloride resin for use in pastes, which comprises subjecting vinyl chloride monomer to microsuspension polymerization or emulsion polymerization in a polymerization apparatus which satisfies the above described H/D requirement; preferably both the H/D requirement and the d/D requirement.

By use of the apparatus and process of the present invention, heat of polymerization can be removed more efficiently from the polymerization system, scale deposition and generation of coarse particles can be diminished, and a vinyl chloride resin for use in pastes which shows good sol viscosity can be produced in a short polymerization time.

The polymerization apparatus and process according to the first aspect of the present invention are explained below in detail.

The polymerization apparatus preferably has a structure which is as simple as possible from the standpoints of minimizing scale deposition and removing deposited scale.

It is, therefore, preferable that the structure of the polymerization apparatus of this invention be such that at least most of the part actually used for polymerization is in the form of a straight-body cylinder (i.e., in a tower form). Further, the ratio, (H/D), of the effective height (H) of the polymerization apparatus to the effective inner diameter (D) of the apparatus is 4 or more; preferably from 5 to 15. The effective height normally means the depth of the liquid fed to the polymerization apparatus.

In general, since long polymerization apparatuses having high H/D ratios are insufficient in mixing in the upward and downward directions, they are rarely used for batch reactions, although sometimes employed for continuous reactions.

The reasons for the above include:

(1) the fact that the reaction system becomes non-uniform due to insufficient mixing in the upward and downward directions; and (2) the fact that it is difficult to control the temperature of the reaction system.

However, the present inventor has found that even if a polymerization apparatus having an H/D ratio of 4 or more is used to conduct the microsuspension polymerization of vinyl chloride, the particle diameter distribution does not differ between the upper and lower part of the polymerization apparatus and a vinyl chloride resin with good quality is obtained, since the monomer is polymerized after being uniformly dispersed to give a relatively stable dispersion having particle diameters of about 1 $\mu$m, while this dispersion is being agitated mildly.

With respect to emulsion polymerization, the problem caused by insufficient mixing in the upward and downward directions has been found to be eliminated by additionally introducing vinyl chloride continuously into the polymerization apparatus from a lower part of the apparatus, allowing the vinyl chloride monomer to disperse uniformly throughout the polymerization apparatus including the upper and lower parts thereof by utilizing the buoyancy of the vinyl chloride monomer, and introducing an initiator and an emulsifying agent from a plurality of feed openings provided in the upper and lower parts of the side wall of the polymerization apparatus. Hence, the above reason (1) can be eliminated in both polymerization processes even if the H/D ratio is high.

The above reason (2) is considered below. This problem is that in the case where a long polymerization apparatus with an H/D ratio of 4 or more is used, the temperature in the apparatus differs between the upper and lower parts of the apparatus when conventional temperature-control systems are employed, and the resulting polymer particles have a wide distribution of polymerization degrees.

In the case of a large-scale polymerization apparatus, in particular, its heat-removing ability per unit volume is low, and if the internal temperature of the polymerization apparatus slightly exceeds a control balance point, the internal temperature rises increasingly due to the insufficient amount of removed heat relative to the amount of heat generated, so that polymerization proceeds in a so-called unstable region. Once a temperature distribution arises and the temperature in the upper part of the polymerization apparatus increases, the specific gravity of the liquid in the upper part of the apparatus becomes small and the difference in specific gravity between the upper and lower part of the liquid becomes large. For this reason, mixing in the upward and downward directions in the polymerization apparatus becomes even more difficult, and there is a danger that a runaway reaction is finally induced.

It has been found that the above problem can be solved by dividing the jacket of the polymerization apparatus and cooling the upper part of the polymerization apparatus more strongly than the lower part thereof, thereby generating mixing flows in the upward and downward directions by means of natural convection to create a uniform temperature distribution.

Illustratively stated, it is preferable that the temperature in the polymerization apparatus be measured at least two points apart from each other in the upward and downward directions, that the jacket be divided into at least two parts, i.e., upper and lower parts corresponding to the points at which the temperature is measured, and that the temperature control of each part of the jacket be done by means of an independent loop.

In polymerization apparatuses having the same volume, the higher the H/D ratio, the larger the heat-transferring area per unit volume. However, H/D ratios of 20 or more create problems concerning apparatus layout and the problem that the maintenance and cleaning of the polymerization apparatuses are troublesome, if the polymerization apparatuses are of an industrial-scale. Therefore, the H/D ratio is generally 20 or less, preferably 15 or less.

The agitating element employed in the polymerization apparatus of the present invention is not particularly limited, and is preferably one which creates little scale, is able to uniformly mix the whole reaction system in the polymerization apparatus, and shows good heat transfer. Exemplary agitating elements that satisfy these requirements include a gate-type, comb-type, paddle, and spiral agitating elements.

In a particularly preferred embodiment, the ratio, (d/D), of the circumferential diameter of the agitating element to the effective inner diameter of the polymerization apparatus is 0.6 or more, more preferably from 0.7 to 0.9.

If the d/D ratio exceeds 0.9, scale is formed in an increased amount due to the shear between the agitating element and the wall of the polymerization apparatus and, hence, the speed of revolution of the agitator cannot be increased. On the other hand, if d/D is below 0.6, an increased amount of scale is formed at a high speed of revolution due to the shear around the agitating element and, hence, the heat transfer coefficient cannot be increased.

The cross section of each blade of the agitating element may be rectangular, circular, or elliptic, or other similar form. Agitating blades through which a cooling medium can be passed are preferred.

Baffles are often used for the purpose of improving the mixing in the upward and downward directions and also in the radial direction and, at the same time, for increasing the heat transfer area. However, in the polymerization for producing a vinyl chloride resin for use in pastes, the speed of revolution of the agitator cannot be increased since scale is generated in an increased amount at a high speed of revolution due to local shear around the baffles. Because of the limitation in the agitator speed of revolution, the heat transfer coefficient may be lowered, far from being increased. Therefore, it is important to take the shape of the agitating element into account when the shape of baffles is decided.

The monomer to be used in the process according to a first aspect of this invention is selected from vinyl chloride and a mixture of vinyl chloride as the major component and a monomer copolymerizable with vinyl chloride (the content of vinyl chloride in the mixture is normally 70% by weight or more). Accordingly, the term "vinyl chloride resin" used herein means a resin obtained by the polymerization of vinyl chloride monomer alone or a resin obtained by the polymerization of a monomer mixture containing vinyl chloride as the major component. Examples of the monomer copolymerizable with vinyl chloride include olefins such as ethylene, propylene, and n-butene, vinyl esters such as vinyl acetate, vinyl propionate, vinyl laurate, and vinyl stearate, unsaturated acids such as acrylic acid, methacrylic acid, and itaconic acid, esters of such acids, vinyl ethers such as methyl vinyl ether, ethyl vinyl ether, octyl vinyl ether, and lauryl vinyl ether, maleic acid and fumaric acid and anhydrides or esters thereof, aromatic vinyl compounds, and unsaturated nitriles.

Examples of an emulsifying agent that can be used in the process according to the first aspect of this invention include the ordinarily employed anionic surface active agents such as alkylsulfonates, alkylallylsulfonates, alkyl alcohol sulfuric acid ester salts, fatty acid salts, and dialkyl sulfosuccinates, with alkali metal salts being particularly preferred. Examples of the emulsifying agent further include nonionic surface active agents such as glycerin esters, glycol esters, or sorbitan esters of higher fatty acids, condensates of higher alcohols, condensates of higher fatty acids, and condensates of poly(propylene oxide).

Examples of an oil-soluble (monomer-soluble) polymerization initiator that can be used in the microsuspension polymerization in the process according to a first aspect of this invention include aromatic diacyl peroxides such as benzoyl peroxide, p-chlorobenzoyl peroxide, and 2,4-dichlorobenzoyl peroxide, aliphatic diacyl peroxides containing alkyl groups having 5 to 17 carbon atoms, such as caproyl peroxide, lauroyl peroxide, and 3,5,5-trimethylhexanoyl peroxide, azo compounds such as azobisisobutyronitrile and azobisvaleronitrile, peroxyesters of organic acids such as t-butyl peroxypivalate, peroxydicarbonates such as diisopropyl peroxydicarbonate and dioctyl peroxydicarbonate, and other known oil-soluble polymerization initiators such as acetyl cyclohexylsulfonyl peroxide. These may be used alone or in a combination of two or more thereof in the form of a solution in a solvent therefor or in vinyl chloride monomer.

Examples of a water-soluble polymerization initiator that can be used in the emulsion polymerization in the process according to a first aspect of this invention include peroxides such as hydrogen peroxide, ammonium persulfate, sodium perborate, potassium persulfate, and sodium persulfate. Examples of an oil-soluble polymerization initiator that can be used in the emulsion polymerization include organohydroperoxides such as t-butyl hydroperoxide, isopentane hydroperoxide, cumene hyiroperoxide, t-butyl-isopropylbenzene hydroperoxide, and diisopropylbenzene hydroperoxide. Further, a combination of such a polymerization initiator and a suitable water-soluble reducing agent such as sodium hydrogen sulfite, sodium thiosulfate, sodium pyrosulfite, or Rongalit may be used.

Examples of other polymerization additives that can be used in the process according to a first aspect of the present invention include higher alcohols such as cetyl alcohol and lauryl alcohol, higher fatty acids such as lauryl acid, palmitic acid, and stearic acid, esters of such higher fatty acids, aromatic hydrocarbons, higher aliphatic hydrocarbons, halogenated hydrocarbons such as chlorinated paraffin, poly(vinyl alcohol), gelatin, particle-diameter regulators (sodium sulfate, sodium hydrogen carbonate, etc.), chain transfer agents, and polymerization inhibitors. These may be used alone or in a combination of two or more thereof.

In the step of mixing the monomer, water and necessary agents and additives to give a uniform dispersion, a known homogenizer or means may be used such as a single-step or two-step pressure pump, a colloid mill, a centrifugal pump, a homomixer, a vibration agitator, a high-pressure jet from a nozzle or orifice, or supersonic waves.

The polymerization reaction may be conducted in an ordinary way. For example, the polymerization temperature may be between 40° and 75° C., the amount of water used for the polymerization may be from 0.6 to 3 times, by weight, the total amount of the monomer, and the emulsifying agent, polymerization initiator, and other polymerization additives may be used in ordinary amounts. Since part of the emulsifying agent, polymerization initiator, other polymerization additives, etc. remain in their feed lines, part of the water to be used for the polymerization may be used to wash away these agents and additives and the resulting washings may be introduced into the polymerization apparatus.

For the purpose of preventing scale deposition, it is desirable that a scale deposition-preventive agent be applied beforehand on the inner surface of the wall of the polymerization apparatus.

According to a second aspect of the present invention a process for producing a vinyl chloride resin, particularly a vinyl chloride resin for use in pastes, is provided which comprises introducing a monomer containing vinyl chloride into a polymerization apparatus from a lower part of the apparatus, and polymerizing the monomer by means of emulsion polymerization.

According to this aspect of the present invention, generation of coarse particles and scale deposition can be diminished, and the polymerization time can be reduced without making the average polymerization degree of the vinyl chloride resin low. Therefore, a larger-scale polymerization apparatus can be employed and improved production efficiency can be obtained.

In a preferred embodiment of the process according to this second aspect of the present invention, the emulsion polymerization of a predetermined amount of vinyl chloride monomer is conducted batch-wise as follows. Part of the predetermined amount of vinyl chloride monomer is first introduced into the polymerization apparatus and polymerization is initiated, and as the polymerization proceeds, the remainder of the vinyl chloride monomer is then fed gradually, preferably as minute droplets, from a lower part of the polymerization apparatus and dispersed in the polymerization system, whereby the polymerization is allowed to further proceed.

The vinyl chloride droplets in such a reaction system in the polymerization apparatus, therefore, are in contact with the aqueous phase. Due to the difference in specific gravity between the vinyl chloride monomer and the aqueous phase, the vinyl chloride monomer droplets ascend in the polymerization apparatus, and as the monomer droplets thus rise, vinyl chloride monomer diffuses from the droplets into the aqueous phase so that the monomer is fed in a sufficient amount to the region where reactions are taking place.

An agitator is preferably provided in the polymerization apparatus. In this case, due to the effect of agitation, the diffusion of vinyl chloride monomer is accelerated, the holdup of vinyl chloride monomer droplets can be increased, and the vinyl chloride monomer droplets can be dispersed almost uniformly throughout the reaction system in the apparatus. Even if agitation is mild, monomer droplets are present at all points from the lower part to the upper part of the apparatus, because the monomer droplets are fed from a lower part of the apparatus and ascend in the apparatus.

In the conventional process in which all the vinyl chloride is introduced at a time, unreacted vinyl chloride separates out and is present on the aqueous phase because of the mild agitation employed, and vinyl chloride to be reacted diffuses into the aqueous phase through the interface between the separated vinyl chloride layer and the aqueous phase. By contrast, in the process of the present invention, because the area of the interface between the vinyl chloride monomer phase and the aqueous phase is significantly large and because vinyl chloride to be reacted diffuses through the interface between respective minute droplets of vinyl chloride monomer and the aqueous phase, vinyl chloride monomer can be fed at a greatly increased rate and, as a result, vinyl chloride monomer is present in a sufficient amount in the region where reactions take place.

If vinyl chloride is fed continuously from an upper part of the polymerization apparatus, the introduced vinyl chloride is drawn into the aqueous phase in the beginning and dispersed as fine droplets, but as the amount of the fed vinyl chloride increases, the vinyl chloride separates out to form a layer of vinyl chloride in the upper part of the polymerization apparatus and drawing of vinyl chloride into the aqueous phase becomes insufficient. Eventually, there is almost no difference between this process and the process in which vinyl chloride is introduced at one time.

As described above, the rate of polymerization in the process in which vinyl chloride is fed at one time or is additionally introduced continuously from an upper part of the polymerization apparatus is determined by the rate of the diffusion of vinyl chloride into the aqueous phase where reactions take place. Since vinyl chloride monomer in the aqueous phase is present locally near the interface between the aqueous phase and the separated vinyl chloride phase layer, the reaction rate can be increased by increasing the amount of the polymerization initiator, but this may result in a polymer having a greatly lowered average molecular weight. This phenomenon, which is well known in the art, means that the amount of vinyl chloride in the reaction region is insufficient.

On the other hand, in the process according to a second aspect of the present invention, polymerization time can be reduced without lowering average molecular weight even if the polymerization initiator is added in an increased amount, since a sufficient amount of vinyl chloride monomer is present throughout the reaction region. The process according to such a second aspect of this invention is particularly effective when applied to polymerization employing a large-scale polymerization apparatus in which mixing in the upward and downward directions is insufficient or a long polymerization apparatus in which the H/D ratio (where H is the effective height, i.e., length of the straight part of the body, of the polymerization apparatus, and D is the effective inner diameter of the apparatus) is 2.5 or more.

In the process according to a second aspect of the present invention, vinyl chloride monomer may be fed directly from the piping therefor to the inside of the polymerization apparatus. It is, however, preferable that vinyl chloride monomer be formed into droplets with an average diameter of 0.1 to 5 mm by means of a droplet-generating device and fed in this droplet form to the polymerization apparatus. If droplet diameter is too large, there are cases where the introduced vinyl chloride monomer ascends to the surface in a short period of time before it diffuses sufficiently into the aqueous phase, and as a result, the monomer may separate from the aqueous phase to form a vinyl chloride monomer phase layer on the aqueous phase. On the other hand, if droplet diameter is too small, the vinyl chloride monomer droplets ascend at very low rates, so that the droplets are present more densely around the feed opening and, hence, cannot be uniformly dispersed to the upper part of the polymerization apparatus.

As the droplet-generating device, any device ordinarily employed for such a purpose can be used. Examples thereof include a spray nozzle and a perforated plate.

The present inventor has further made intensive studies with regard to the relationship between certain production conditions, i.e., the structure of a polymerization apparatus having a condenser and agitator and polymerization conditions, and the heat-removing efficiency of the condenser, temperature distribution in the liquid phase, the amount of scale, final conversion, polymerization time, etc. As a result, it has been found that objects of the present invention as described hereinbefore are accomplished also with a process for producing a vinyl chloride resin, which comprises introducing a monomer containing vinyl chloride into a polymerization apparatus from a lower part of the apparatus, and polymerizing the monomer by means of emulsion polymerization.

Whether the polymerization apparatus has a condenser or not, the effect of the above-described process of this invention, in which the monomer is fed from a lower part of the polymerization apparatus, can be obtained. However, in the case where the polymerization apparatus is equipped with a condenser, the condenser can provide improved cooling efficiency in contrast to ones employed in conventional polymerization processes.

The reason for the above is as follows. In the conventional processes in which all the monomer to be used is introduced into the polymerization apparatus at a time or in which polymerization is conducted while part of the monomer is being fed from an upper part of the polymerization apparatus, the monomer, which has a small specific gravity, is apt to be present more densely in the upper part of the polymerization apparatus because of the mild agitation, so that the monomer is not in a uniformly dispersed state in the lower part of the apparatus. In most cases, the monomer is present normally as a separated monomer phase layer on the latex phase. During polymerization, unreacted monomer evaporates from the separated layer of unreacted monomer phase in the upper part of the polymerization apparatus, is condensed by the condenser, and then returns to the monomer phase layer. Therefore, only the upper part of the polymerization apparatus is cooled, and removal of polymerization heat is not effective.

On the other hand, the temperature of the latex phase rises because polymerization proceeds in the latex phase, and heat of polymerization transfers through the interface between the monomer phase and the latex phase. Therefore, as the size of polymerization apparatuses increases, heat transfer through the interface becomes rate-determining, the liquid reaction mixture in the polymerization apparatus comes to have a larger difference in temperature between the upper and lower parts thereof due to insufficient mixing of the reaction mixture in the upward and downward directions, and the control of polymerization temperature becomes difficult.

In contrast to the above, in the process according to a third aspect of the present invention, vinyl chloride monomer is introduced from a lower part of the polymerization apparatus through a droplet-generating device such as a nozzle. The thus-fed monomer droplets ascend in the polymerization apparatus due to the difference in specific gravity between the droplets and the aqueous phase, and as the droplets rise, they are reduced into finer droplets by the action of an agitator provided in the polymerization apparatus and are dispersed uniformly throughout the reaction system in the polymerization apparatus.

Therefore, even if a higher-temperature area has been created in the reaction system, the area can be easily cooled and eliminated by the evaporation of monomer because monomer droplets are present in that higher-temperature area.

The term "lower part of a polymerization apparatus" herein means that part of a polymerization apparatus which extends from the bottom of the apparatus to a height that is ½ preferably ⅓, and more preferably 1/5, of the maximum depth of the liquid phase during polymerization.

In the process of this invention, upward flows are formed in the reaction system due to the formation of bubbles resulting from vaporization of monomer and these upward flows create downward flows, and as a result, mixing in the upward and downward directions in the reaction system is enhanced and the width of the temperature distribution in the liquid phase part in the polymerization apparatus is reduced.

Furthermore, because of the significantly increased area of the interface between the monomer phase and the aqueous phase, the problem that the rate of polymerization reaction is determined by the diffusion of monomer into aqueous phase is eliminated and the polymerization time can be reduced.

The polymerization apparatus that can be used in the process according to a third aspect of this invention may be one which is generally used for the polymerization of vinyl chloride monomer and which can be equipped with a condenser and agitator if required. The condenser and agitator are not particularly limited in type and, like the polymerization apparatus, can be ones ordinarily employed in the polymerization of vinyl chloride monomer. However, in view of the problems described hereinbefore, it is preferable to employ an agitator that is of a low-shear type but is able to agitate the reaction system sufficiently.

In an especially preferred embodiment of the process according to a third aspect of this invention, the agitator provided in the polymerization apparatus is a paddle-type, anchor-type, gate-type, or comb-type agitating element. In this case, polymerization can be conducted, for example, under the following conditions; the ratio, (d/D), of the length (d) of the agitating element to the diameter (D) of the polymerization apparatus is from 0.3 to 0.9, and the circumferential speed of the agitating element $\pi dn/60$; n is the revolution number per minutes) is from 0.1 to 1.4 m/sec.

The time and period when the condenser is used are not particularly limited. Therefore, it is used normally from the initial stage of polymerization to the time when conversion to polymer reaches 85%.

In a particularly preferred embodiment of the process according to a third aspect of this invention, 5 to 25% by weight, preferably 5 to 15% by weight, of the total amount of the whole vinyl chloride monomer to be used (the total amount of the whole monomer that is to be introduced before the polymerization is ceased) is first introduced into the polymerization apparatus. Subsequently, feeding of a polymerization initiator is begun to initiate polymerization, and as the polymerization proceeds, the remainder of the vinyl chloride monomer is gradually introduced. Since polymerization normally proceeds slowly in the beginning (the so-called induction period), the vinyl chloride monomer introduced is accumulated in the reaction system and gradually increases in amount. The introduction of the remainder of the vinyl chloride monomer is performed in such amounts that the amount of the vinyl chloride monomer remaining unreacted in the polymerization apparatus is maintained in the range of from 10 to 30% by weight, and preferably from 15 to 25% by weight, based on the total amount of the monomer introduced and that to be introduced. If the amount of vinyl chloride monomer introduced during polymerization is too large and the proportion of unreacted vinyl chloride monomer exceeds the above-specified upper limit, the vinyl chloride monomer becomes apt to separate out onto the surfaces of the reaction system and, as a result, the heat-removing power of the condenser may be lowered and the rate of polymerization may also be lowered. On the other hand, if the amount of vinyl chloride monomer introduced during polymerization is too small, a sufficient amount of vinyl chloride monomer cannot be fed to the region where reactions take place, mainly because the additionally introduced vinyl chloride is adsorbed onto polymer particles etc., although the heat-removing power of the condenser is not impaired. The insufficient feeding of the monomer may also result in a lowered polymerization rate and a lowered average molecular weight. In practicing the polymerization, it is preferable that conversion to polymer be estimated and the manner in which vinyl chloride monomer is additionally introduced be determined beforehand, or that conversion to polymer be calculated online from the amount of the heat generated by polymerization (the amount of the heat removed by cooling water) by means of a computer to control the rate of additional feeding of vinyl chloride monomer.

The polymerization initiator and emulsifying agent that are additionally introduced during polymerization in the process according to a third aspect of the present invention are highly likely to be consumed by reactions around the feed opening, especially when mixing in the upward and downward directions in the reaction system is insufficient. It is, therefore, preferable that these agents be fed from a feed opening provided in the middle of the liquid phase. More preferably, they are fed from a plurality of feed openings provided in the upper and lower parts of the polymerization apparatus.

The monomer to be used in the process according to a first aspect of this invention is selected from vinyl chloride and a mixture of vinyl chloride as the major component and a monomer copolymerizable with vinyl chloride (the content of vinyl chloride in the mixture is normally 70% by weight or more). Accordingly, the term "vinyl chloride resin" used herein means a resin obtained by the polymerization of vinyl chloride monomer alone or a resin obtained by the polymerization of a monomer mixture containing vinyl chloride as the major component. Examples of the monomer copolymerizable with vinyl chloride include olefins such as ethylene, propylene, and n-butene, vinyl esters such as vinyl acetate, vinyl propionate, vinyl laurate, and vinyl stearate, unsaturated acids such as acrylic acid, methacrylic acid, and itaconic acid, esters of such acids, vinyl ethers such as methyl vinyl ether, ethyl vinyl ether, octyl vinyl ether, and lauryl vinyl ether, maleic acid and fumaric acid and anhydrides or esters thereof, aromatic vinyl compounds, and unsaturated nitriles.

The anionic surface active agent that can be used in the process according to a third aspect of the present invention can be at least one of the ordinarily employed anionic surface active agents. Examples thereof include alkali metal (e.g., sodium and potassium) salts, ammonium salts, or triethanolamine salts of alkylbenzenesulfonic acids, alkylsulfonic acids, fatty acids, mono- or dialkylsulfosuccinic acids, succinic acid dialkyl ester sulfonic acids, alkane sulfates, polyoxyethylene carboxylate sulfates, polyoxyethylene carboxylic acid alkyl ether sulfates, poly(oxyethylene-oxypropylene) carboxylate sulfates, poly(oxyethylene-oxypropylene) alkyl ether sulfates, and fatty acid ester sulfonic acids.

Examples of nonionic surface active agents that can be used include known nonionic surface active agents, e.g., compounds having a polyoxyethylene segment in the molecule, such as polyoxyethylene alkylphenyl ethers, polyoxyethylene alkyl ethers, polyoxyethylene fatty acid esters, polyoxyethylene sorbitan fatty acid esters, polyoxyethylene alkyl ether borates, polyoxyethylene alkyl ether phosphates, and polyoxyethylene; compounds having the same structures as those of the above compounds except that the polyoxyethylene segment has been replaced by a copolymer of oxyethylene and oxypropylene; and other compounds such as sorbitan fatty acid esters, glycerin fatty acid esters, fatty acid glycerin borates, pentaerythritol fatty acid esters, and condensates of higher alcohols.

The amounts of the surface active agents (emulsifying agent) used are not particularly limited. In general, however, the anionic surface active agent is used in an amount of about 0.01 to 7 parts by weight, and the nonionic surface active agent is used in an amount of about 0 to 5 parts by weight, per 100 parts by weight of all the monomer.

As the water-soluble polymerization initiator (catalyst) for use in the process according to a third aspect of the present invention, any of the initiators that are conventionally used in the emulsion polymerization of vinyl chloride can be employed. Specific examples of the water-soluble polymerization initiator include ones which form free radicals, such as hydrogen peroxide, ammonium persulfate, potassium persulfate, and sodium perborate. A combination of such an initiator and a suitable reducing agent, such as sodium hydrogen sulfite, sodium thiosulfate, sodium pyrosulfite, Rongalit, or ferrous sulfate, can also be used. Examples of oil-soluble initiators include organohydroperoxides such as t-butyl hydroperoxide, isopentane hydroperoxide, and cumene hydroperoxide. The amount of the initiator used is generally in the range of from 0.0001 to 2 parts by weight per 100 parts by weight of all the monomer introduced.

A particularly preferred formulation for use in the emulsion polymerization in the process according to a third aspect of the present invention is as follows: monomer 100 parts by weight, nuclear polymer 0–30 parts by weight, water-soluble redox catalyst 0.0001–2 parts by weight, anionic surface active agent 0.01–5 parts by weight, and nonionic surface active agent 0–4 parts by weight. In addition, a higher fatty acid, higher alcohol, inorganic salt, water-soluble polymer, and the like can be used.

The polymerization reaction can be conducted in an ordinary way. For example, the polymerization temperature can be from 40° to 70° C., and the amount of water used for the polymerization can be from 0.6 to 3 times, by weight, the amount of all the monomer.

The effects brought about by the polymerization apparatus and process according to a first aspect of the present invention as described above are that the heat of polymerization can be removed more efficiently as compared with conventional processes, that the polymerization time can be reduced because stable temperature control is attainable, and that the efficiency of the polymerization process for producing a vinyl chloride resin for use in pastes which has good sol viscosity can be improved without increasing the amounts of scale deposits and coarse particles.

According to the process provided in a second aspect of the present invention as described above, in which vinyl chloride is introduced from a lower part of the polymerization apparatus, it is possible to minimize the formation of coarse particles and scale and, at the same time, the polymerization time can be reduced without lowering the average polymerization degree of the resin produced, since the region where reactions take place can be made uniform and the whole polymerization apparatus can be utilized efficiently, as compared with conventional processes. Therefore, a larger-scale polymerization apparatus can be employed and an improved production efficiency is attainable.

As described above, according to the present invention, polymerization time can be reduced and, at the same time, it has become possible to efficiently remove polymerization heat by means of a condenser, without increasing the amount of scale. It is, therefore, possible to improve production efficiency and to employ a larger-scale polymerization apparatus.

Furthermore, in the case where the polymerization apparatus is equipped with a condenser, the heat-removing effect due to the evaporation of monomer can be utilized when part of the total amount of the monomer to be used is first introduced into the polymerization apparatus and then, as the polymerization proceeds, the remainder of the monomer is fed from a lower part of the polymerization apparatus. In this case, the condenser can be run below its heat-removing capacity, and the width of the temperature distribution in the reaction system can be reduced. As a result, the necessity of strong agitation can be avoided and the amount of scale formed during polymerization can be reduced.

DESCRIPTION OF PREFERRED EMBODIMENTS

The present invention will be explained below in more detail by reference to the following Examples and Comparative Examples, but the Examples should not be construed as limiting the scope of the invention. In these examples, all percentages are by weight unless otherwise indicated.

For the purpose of comparing heat-removing abilities, polymerization apparatuses having different H/D ratios and having the same effective volume of 1.1 m$^3$ were employed. The amounts of polymerization initiators were determined beforehand so that microsuspension polymerization in Examples 1 to 6 and Comparative Examples 1 to 4 could be conducted at a jacket minimum temperature of 39° to 40° C. and emulsion polymerization in Examples 7 to 9 and Comparative Examples 5 and 6 could be conducted at a jacket minimum temperature of 33° to 34° C.

Examples 10 and 11 and Comparative Examples 7 to 9 are experiments which were performed to demonstrate the effects of this invention with respect to the amounts of scale and coarse particles, while Examples 12 to 14 and Comparative Examples 10 to 13 are experiments which were performed to demonstrate the effects of this invention with respect to scale amount and cooling efficiency.

EXAMPLE 1

Into a dispersing tank having a capacity of 1.2 m$^3$ and equipped with a stirrer was introduced 390 kg of ion-exchanged water. Subsequently, an aqueous emulsifying agent solution which had been prepared beforehand by dissolving (at 80° C.) 2.7 kg of sodium lauryl sulfate and 2.7 kg of cetyl alcohol in 60 kg of ion-exchanged water and then cooling the resulting solution to ordinary temperature, and a polymerization initiator solution obtained by dissolving 144 g of α, α'-azobisisobutyrovaleronitrile (ABVN) in 0.5 liter of toluene were introduced into the dispersing tank. After the tank was evacuated for 10 minutes, 450 kg of vinyl chloride monomer was introduced and then dispersed with stirring for 60 minutes by means of a centrifugal pump having a capacity of 10 m$^3$/hr, thereby giving a uniform dispersion.

The thus-obtained dispersion was transferred to an evacuated stainless-steel polymerization apparatus to which a scale-preventive agent had been applied beforehand and which was equipped with a paddle agitator and had a diameter (D) of 0.65 m, a straight body part height (H) of 3.25 m (H/D=5), a jacket heat transfer area of 6.7 m$^2$, and an agitating element outer diameter of 52 cm (d/D=0.8). The inside of the polymerization apparatus was pressurized with nitrogen so that the internal pressure just after the introduction of the dispersion was increased by 1 kg/cm$^2$. The dispersion was then heated with agitation and polymerization was conducted at 50° C. The speed of revolution of the agitator was 20 r.p.m.

When the internal pressure of the apparatus had decreased to 7 kg/cm²G, the vinyl chloride monomer remaining unreacted was recovered. During the polymerization, the temperature in the apparatus was measured at two points, upper and lower, and the temperature control of the jacket which had been divided into two parts was done so that the two parts were controlled independently.

The latex thus obtained was examined for conversion to polymer, amount of coarse particles, amount of scale, and sol viscosity.

The amount of coarse particles was determined by measuring that amount of resin in the latex which passed through a 32-mesh screen but not through a 100-mesh screen. (The amount of coarse particles is shown in terms of percent by weight based on the amount of the vinyl chloride monomer introduced.)

The amount of scale was determined by measuring the total amount of scale which remained in or was adhered to the inside of the polymerization apparatus and scales which was filtered out with a 10-mesh metal gauze provided in the latex-withdrawal line. (The amount of scale is shown in terms of percent based on the amount of the vinyl chloride monomer introduced.)

The sol viscosity was measured as follows. The latex obtained was dried at 52° C. with a spray dryer, and the dry resin was pulverized by a pulverizer. 100 Parts by weight of the pulverized resin was mixed with 65 parts by weight of dioctyl phthalate (DOP), and the resulting mixture was kneaded with a planetary mill to obtain a sol. After this sol had been maintained at 30° C. in a thermostatic chamber for 1 hour, the sol viscosity (centipoise) was measured with a Brookfield-type viscometer.

EXAMPLES 2 TO 5

Uniform vinyl chloride monomer dispersions were prepared and polymerizations were conducted in the same manner as in Example 1 except that the amounts of ABVN used in Examples 2, 3, 4, and 5 were 135 g, 162 g, 194 g, and 207 g, respectively, that a stainless-steel polymerization apparatus equipped with a gate-type agitating element and having a diameter of 0.52 m, a straight body part height of 5.2 m (H/D=10) and a jacket heat transfer area of 8.3 m² was used, and that the agitating element outer diameters were 20.8 cm (d/D=0.4), 31.2 cm (d/D=0.6), 41.6 cm (d/D=0.8), and 46.8 cm (d/D=0.9) for Examples 2, 3, 4, and 5, respectively. The speeds of revolution of the agitator were 40 r.p.m., 30 r.p.m., 23 r.p.m., and 21 r.p.m. in Examples 2, 3, 4, and 5, respectively.

EXAMPLE 6

A uniform vinyl chloride monomer dispersion was prepared and polymerization was conducted in the same manner as in Example 1 except that the amount of ABVN was 207 g, and that a stainless-steel polymerization apparatus equipped with a spiral agitating element with an outer diameter of 36 cm and having a diameter of 0.45 m (d/D=0.8), a straight body part height of 6.75 m (H/D=15), and a jacket heat transfer area of 9.2 m² was used. The speed of revolution of the agitator was 26 r.p.m.

COMPARATIVE EXAMPLE 1

A uniform vinyl chloride monomer dispersion was prepared and polymerization was conducted in the same manner as in Example 1 except that the amount of ABVN used as a polymerization initiator was 81 g, that a stainless-steel polymerization apparatus equipped with a gate-type agitating element with an outer diameter of 32 cm and having a diameter of 0.8 m (d/D=0.4), a straight body part height of 2 m (H/D=2.5), and a heat transfer area of 5.3 m² was used, and that the temperature in the apparatus was measured at a single point for controlling the internal temperature. The speed of revolution of the agitator was 30 r.p.m.

COMPARATIVE EXAMPLE 2

A uniform vinyl chloride monomer dispersion was prepared and polymerization was conducted in the same manner as in Example 1 except that the amount of ABVN used as a polymerization initiator was 113 g, and that the polymerization apparatus used was the same as that used in Comparative Example 1 except that it was equipped with a gate-type agitating element having an outer diameter of 64 cm (d/D=0.8). The speed of revolution of the agitator was 17 r.p.m.

COMPARATIVE EXAMPLE 3

A uniform vinyl chloride monomer dispersion was prepared and polymerization was conducted in the same manner as in Example 1 except that the amount of ABVN used as a polymerization initiator was 122 g, the same polymerization apparatus as that used in Comparative Example 1 was used except that four cylindrical baffles with an outer diameter of 6.5 cm had been provided therein, and polymerization was conducted while the reaction system was being cooled with both jacket and baffles. The speed of revolution of the agitator was 30 r.p.m.

COMPARATIVE EXAMPLE 4

A uniform vinyl chloride monomer dispersion was prepared and polymerization was initiated in the same manner as in Example 1 except that the amount of ABVN was 194 g and the polymerization apparatus used in Comparative Example 1 was used. The speed of revolution of the agitator was 30 r.p.m.

From the time when two hours had passed from the initiation of polymerization to the time just before the product was withdrawn, the polymerization was allowed to proceed while the polymerization temperature was being controlled with the jacket and an external cooler. The heat removal by the external cooler was conducted as follows. The latex in the polymerization apparatus was continuously withdrawn and sent, through a diaphragm pump, to a double-tube heat exchanger (external cooler) having a heat transfer area of 1.5 m², and then returned to the polymerization apparatus. In the external cooler, heat was removed at about 15,000 kcal/hr.

After completion of the polymerization, the apparatus and other equipment were inspected. As a result, large amounts of scale were observed in the pump, heat exchanger, and latex piping.

The results obtained in Examples 1 to 6 and Comparative Examples 1 to 4 are summarized in Table 1.

TABLE 1

|  | H/D (-) | d/D (-) | Cooling method | Polymerization time (hr) | Conversion to polymer (%) | Coarse particle amount (%) | Sol viscosity (cp) | Scale amount (%) |
|---|---|---|---|---|---|---|---|---|
| Example 1 | 5 | 0.8 | J | 9.5 | 91 | 0.041 | 2670 | 0.35 |
| Example 2 | 10 | 0.4 | J | 10 | 89 | 0.036 | 2450 | 0.31 |
| Example 3 | 10 | 0.6 | J | 8.5 | 90 | 0.046 | 2720 | 0.48 |
| Example 4 | 10 | 0.8 | J | 7.5 | 89 | 0.040 | 2740 | 0.46 |
| Example 5 | 10 | 0.9 | J | 7.0 | 89 | 0.042 | 2930 | 0.34 |
| Example 6 | 15 | 0.8 | J | 7.0 | 91 | 0.055 | 2820 | 0.43 |
| Comparative Example 1 | 2.5 | 0.4 | J | 16.0 | 89 | 0.042 | 2550 | 0.26 |
| Comparative Example 2 | 2.5 | 0.8 | J | 12.0 | 90 | 0.035 | 2680 | 0.32 |
| Comparative Example 3 | 2.5 | 0.4 | J + B | 11.0 | 88 | 0.106 | 4360 | 0.86 |
| Comparative Example 4 | 2.5 | 0.4 | J + EC | 8.0 | 85 | 0.218 | 5700 | 1.25 |

J: Cooling with jacket
B: Cooling with baffle
EC: Cooling with external cooler

EXAMPLE 7

Into the polymerization apparatus used in Example 1 were introduced 390 kg of ion-exchanged water, 11 kg (on a dry basis) of a 0.3-μ seed latex, 120 g of sodium lauryl sulfate, 76.5 g of Rongalit, and 0.022 g of FeSO$_4$ 7H$_2$O. After the internal pressure of the polymerization apparatus was reduced to 25 mmHg by means of a vacuum pump, 22.5 kg of vinyl chloride monomer was introduced as the initial feed, and the temperature in the polymerization apparatus was raised with agitation at 60 r.p.m.

At the time when the temperature in the apparatus reached 40° C., feeding of a 0.05% aqueous solution of hydrogen peroxide was initiated. The hydrogen peroxide solution was introduced into the liquid phase at feed rates of 5.4 l/hr for the first 3 hours, 2.7 l/hr for the next 1 hour, 1.54 l/hr for the next 1 hour, and 1.34 l/hr thereafter, from three feed openings which were provided in the polymerization apparatus spaced apart from one another in the direction of the height of the apparatus so that the hydrogen peroxide solution was uniformly dispersed into the liquid phase from the feed openings according to the changing liquid surface level.

Simultaneously with the introduction of hydrogen peroxide solution, the remaining vinyl chloride monomer weighing 427.5 kg was introduced into the polymerization apparatus from a lower part of the apparatus through a nozzle having an inner diameter of 4 mm, in accordance with vinyl chloride monomer addition rates obtained from a conversion-to-polymer curve predicted beforehand. Thus, polymerization was conducted at 40° C.

During the polymerization, the latex was sampled every hour, and the rate of additionally introducing vinyl chloride monomer was corrected so that the amount of the vinyl chloride monomer remaining unconverted into polymer was regulated at 15 to 20% based on the total amount of all the vinyl chloride monomer introduced and to be introduced.

Further, 40.5 liters of a 5% aqueous solution of sodium dodecylbenzenesulfate was introduced into the polymerization apparatus at a constant rate of 6.75 l/hr from the time when 2 hours had passed from the initiation of polymerization to the time when 8 hours passed since polymerization initiation. 10.5 Hours after the start of the polymerization, feeding of hydrogen peroxide was stopped and the vinyl chloride monomer remaining unreacted was recovered.

EXAMPLE 8

Using the polymerization apparatus used in Example 5, polymerization was conducted in the same manner as in Example 7 except that hydrogen peroxide was introduced as a 0.1% aqueous solution thereof at feed rates of 4.5 l/hr for the first 2 hours, 2.25 l/hr for the next 1 hour, 1.29 l/hr for the next 1 hour, and 1.12 l/hr thereafter, and that a 5% aqueous sodium dodecylbenzenesulfate solution was introduced at a constant rate of 9 l/Hr from the time when 1.5 hours had passed from the initiation of polymerization to the time when 6 hours passed from the initiation of polymerization (a total of 40.5 liters was added).

Eight hours after the start of the polymerization, feeding of hydrogen peroxide was stopped and the vinyl chloride monomer remaining unreacted was recovered. The speed of revolution of the agitator was 63 r.p.m.

EXAMPLE 9

Polymerization was conducted in the same manner as in Example 8 except that the polymerization apparatus used in Example 6 was used. The speed of revolution of the agitator was 75 r.p.m.

COMPARATIVE EXAMPLE 5

Using the polymerization apparatus used in Comparative Example 1, polymerization was conducted in the same manner as in Example 7 except that hydrogen peroxide was introduced as a 0.05% aqueous solution thereof at feed rates of 1.8 l/hr for the first 4 hours, 0.9 l/hr for the next 3 hours, 0.52 l/hr for the next 2 hours, and 0.44 l/hr thereafter, and that a 5% aqueous sodium dodecylbenzenesulfate solution was introduced at a constant rate of 3.86 l/hr from the time when 2.5 hours had passed from the initiation of polymerization to the time when 13 hours passed since polymerization initiation (a total of 40.5 liters was added).

Eighteen hours after the start of the polymerization, feeding of hydrogen peroxide was stopped and the vinyl chloride monomer remaining unreacted was recovered. The speed of revolution of the agitator was 90 r.p.m.

COMPARATIVE EXAMPLE 6

Using the polymerization apparatus used in Comparative Example 1, polymerization was conducted in the same manner as in Example 8 except that from the time when 1 hour had passed from the initiation of polymerization to the time when 8 hours passed from the initiation of polymerization, the polymerization was allowed to proceed while the amount of removed heat was being regulated at 10,000 to 15,000 kcal/hr by means of a reflux condenser provided in the top part of the polymerization apparatus and having a heat transfer area of 3 m$^2$.

Eight hours after the start of the polymerization, feeding of hydrogen peroxide was stopped and the vinyl chloride monomer remaining unreacted was recovered. The speed of revolution of the agitator was 90 r.p.m.

The results obtained in Examples 7 to 9 and Comparative Examples 5 and 6 are summarized in Table 2.

During the polymerization, the latex was sampled every hour, and the rate of additionally introducing vinyl chloride monomer was corrected so that the amount of the vinyl chloride present in the apparatus was regulated at 15 to 20% based on the total amount of all the vinyl chloride monomer introduced and to be introduced (450 kg).

Further, 40.5 liters of a 5% aqueous solution of sodium dodecylbenzenesulfonate was introduced into the polymerization apparatus at a constant rate of 9 l/hr from the time when 1.5 hours had passed from the initiation of polymerization to the time when 6 hours passed from the initiation of polymerization.

Eight hours after the start of the polymerization, feeding of hydrogen peroxide was stopped and the vinyl chloride monomer remaining unreacted was recovered.

The latex thus obtained was examined for conversion to polymer and for the average polymerization degree of the resin, and the amount of coarse particles con-

TABLE 2

|  | H/D (-) | d/D (-) | Cooling method | Polymerization time (hr) | Conversion to polymer (%) | Coarse particle amount (%) | Sol viscosity (cp) | Scale amount (%) |
| --- | --- | --- | --- | --- | --- | --- | --- | --- |
| Example 7 | 5 | 0.8 | J | 10.5 | 92 | 0.024 | 2860 | 0.51 |
| Example 8 | 10 | 0.9 | J | 8.0 | 92 | 0.038 | 2500 | 0.48 |
| Example 9 | 15 | 0.8 | J | 8.0 | 93 | 0.036 | 2660 | 0.52 |
| Comparative Example 5 | 2.5 | 0.4 | J | 18.0 | 92 | 0.019 | 2530 | 0.52 |
| Comparative Example 6 | 2.5 | 0.4 | J + RC | 8.0 | 93 | 0.055 | 3000 | 0.95 |

J: Cooling with jacket
RC: Cooling with reflux condenser

EXAMPLE 10

Into a polymerization apparatus having an inner diameter of 0.52 m, a straight body part length of 5.2 m, and a capacity of 1.1 m$^3$ were introduced 390 kg of ion-exchanged water, 11 kg (on a dry basis) of a 0.3-$\mu$ seed latex, 120 g of sodium lauryl sulfate, 76.5 g of Rongalit, and 0.022 g of FeSO$_4$ 7H$_2$O. The internal pressure of the polymerization apparatus was then reduced to 25 mmHg by means of a vacuum pump. Subsequently, 22.5 kg of vinyl chloride (5% of the total amount of the vinyl chloride monomer to be introduced) was introduced as the initial feed, and polymerization was allowed to proceed with agitation.

When the temperature in the apparatus reached 40° C., feeding of a 0.1% aqueous solution of hydrogen peroxide was initiated. The hydrogen peroxide solution was introduced into the liquid phase at feed rates of 4.5 l/hr for the first 2 hours, 2.25 l/hr for the next 1 hour, 1.29 l/hr for the next 1 hour, and 1.12 l/hr thereafter, from three feed openings which were provided in the polymerization apparatus spaced apart from one another in the direction of the height of the apparatus so that the hydrogen peroxide solution was uniformly dispersed into the liquid phase from the feed openings according to the changing liquid surface level.

Simultaneously with the introduction of hydrogen peroxide solution, the remaining vinyl chloride monomer weighing 427.5 kg was introduced into the polymerization apparatus from a lower part of the apparatus through a pipe having an inner diameter of 4 mm, in accordance with vinyl chloride monomer addition rates obtained from a conversion-to-polymer curve predicted beforehand. Thus, polymerization was allowed to proceed.

tained in the latex and the amount of scale adhering to the inside of the polymerization apparatus were measured.

The amount of coarse particles was determined by measuring that amount of resin in the latex which passed through a 32-mesh screen (JIS Standard Z-8801) but not through a 100-mesh screen. (The amount of coarse particles is shown in terms of percent by weight based on the amount of the vinyl chloride monomer introduced.)

The amount of scale was determined by measuring the total amount of scale which remained in or was adhered to the inside of the polymerization apparatus and scale which was filtered out with a 10-mesh metal gauze provided in the latex-withdrawal line. (The scale amount is shown in terms of percent by weight based on the amount of the vinyl chloride monomer introduced.)

After completion of the polymerization, the polymerization tank was washed with water and inspected. As a result, the amount of scale deposits was found to be very small.

EXAMPLE 11

Polymerization was conducted in the same manner as in Example 10 except that the additional incorporation of vinyl chloride monomer was done through a spray nozzle generating droplets having an average diameter of 0.45 mm.

The amount of scale deposits in the tank was very small.

COMPARATIVE EXAMPLE 7

Polymerization was conducted in the same manner as in Example 10 except that the whole amount, 450 kg, of the vinyl chloride to be introduced was fed from an upper part of the polymerization apparatus at one time before polymerization, and additional incorporation of vinyl chloride monomer during polymerization was omitted.

A considerable amount of scale deposits were observed in the middle of the inside of the apparatus (around the area that had been in contact with the interface between the vinyl chloride phase layer and water phase).

COMPARATIVE EXAMPLE 8

Polymerization was conducted in the same manner as in Example 10 except that 180 kg of vinyl chloride (40% of the total amount of the vinyl chloride monomer to be introduced) was first introduced, and that the polymerization was allowed to proceed while the remaining monomer was being additionally introduced from an upper part of the polymerization apparatus in such a manner that the amount of the vinyl chloride present in the apparatus during polymerization was regulated at 40 to 45% based on the total amount of the vinyl chloride introduced and to be introduced.

A considerable amount of scale deposits were observed in the middle of the inside of the apparatus.

COMPARATIVE EXAMPLE 9

Polymerization was conducted in the same manner as in Example 10 except that 22.5 kg of vinyl chloride monomer (5% of the total amount of the vinyl chloride monomer to be introduced) was first introduced, and that polymerization was allowed to proceed while the remaining monomer was being additionally introduced from an upper part of the polymerization apparatus in such a manner that the amount of the vinyl chloride present in the apparatus during polymerization was regulated at 5 to 10% based on the total amount of the vinyl chloride introduced and to be introduced. The amount of scales deposited on the inside of the apparatus was very small.

The results obtained in Examples 10 and 11 and Comparative Examples 7 to 9 are summarized in Table 3.

TABLE 3

| | Example | | Comparative Example | | |
|---|---|---|---|---|---|
| | 10 | 11 | 7 | 8 | 9 |
| Conversion to polymer (%) | 88 | 92 | 33 | 75 | 80 |
| Average polymerization degree (-) | 2550 | 2540 | 1950 | 2410 | 1730 |
| Coarse particle amount (%) | 0.04 | 0.05 | 0.15 | 0.1 | 0.04 |
| Scale amount (%) | 0.51 | 0.52 | 1.0 | 0.8 | 0.5 |

In each of the Examples and Comparative Examples given below, a particularly large temperature difference ($\Delta T$) that arose in the liquid phase during polymerization was measured and, at the same time, the heat-removing efficiency of the condenser was also evaluated. Evaluation was further made with respect to the amount of scale.

These evaluations were made by the following methods.

(1) Method for Calculating Liquid Phase Temperature Difference ($\Delta T$) During Polymerization Ten thermocouples were installed in the polymerization apparatus in order that temperature distribution in the vertical direction in the polymerization apparatus could be measured. From a middle region temperature ($T_1$, °C.) and upper region temperature ($T_2$, °C.) measured during the polymerization reaction, the liquid phase temperature difference ($\Delta T$, °C.) was calculated using the following equation:

$$\Delta T = (T_2 - T_1) \tag{1}$$

(2) Method for Calculating the Heat-Removing Efficiency ($\xi$) of the Condenser Heat-removing efficiency ($\xi$, %) is calculated using the following equation:

$$\text{heat-removing efficiency } (\xi, \%) = Q_i/Q_s \times 100 \tag{2}$$

where $Q_i$ (kcal/hr) is the amount of heat removable at the time of the above temperature measurement, and $Q_s$, (kcal/hr) is the amount of heat removable at the time when the agitation during polymerization is nearly perfect (i.e., the circumferential speed of the agitating element is 1.5 m/sec or more).

$Q_i$ and $Q_s$ were calculated, after the amount of cooling water passing through the condenser (FI, m$^3$/hr), the temperature of cooling water at the inlet ($T_3$, °C.), and the temperature of cooling water at the outlet ($T_4$, °C.) were measured at respective times during polymerization, using the following equation:

$$Q = C_p \cdot \rho \cdot FI(T_4 - T_3) \tag{3}$$

where Q (kcal/hr) is the amount of removable heat ($Q_i$ or $Q_s$), $C_p$ is the specific heat (kcal/kg° C.) of cooling water, and $\rho$ is the density (kg/m$^3$) of cooling water. The heat-removing efficiency was obtained by substituting the $Q_i$ and $Q_s$ values in equation (2).

(3) Measurement of the Amount of Scale Formed During Polymerization

The scale formed during polymerization is roughly divided into two groups. One kind of scale is that which adheres to the inner wall of the polymerization apparatus, and is called adherent scale. The other kind of scales are coagulated polymer particles contained in the latex after completion of polymerization, and is called floating scale. The amount of each kind of scale was measured as follows.

a. Amount of Adherent Scale (g)

After completion of the polymerization reaction, the polymerization apparatus was opened, and the scale adherent to the apparatus wall was scraped off with a scraper, collected, dried at 50° C. in an air bath for 24 hours, and then weighed.

b. Amount of Floating Scale (g)

After completion of the polymerization, the latex obtained was filtered through a 32-mesh metal gauze, and the coagulated polymer particles remaining on the metal gauze were dried at 50° C. in an air bath for 24 hours, and then weighed.

EXAMPLE 12

Into a polymerization apparatus which was equipped with a condenser and an agitator (gate-type agitating element) and had an inner diameter of 0.8 m, a straight body part length of 2.0 m, and a capacity of 1.1 m$^3$ were introduced 600 kg of ion-exchanged water, 11 kg (on a dry basis) of a 0.3-$\mu$ seed latex, 120 g of sodium lauryl sulfate, 76.5 g of Rongalit, and 0.022 g of FeSO$_4$ 7H$_2$O.

The internal pressure of the polymerization apparatus was then reduced to 25 mmHg by means of a vacuum pump. Subsequently, 22.5 kg of vinyl chloride (5% of the total amount of the vinyl chloride monomer to be introduced) was introduced as the initial feed, and polymerization was allowed to proceed with agitation.

When the temperature in the apparatus reached 40° C., feeding of a 0.1% aqueous solution of hydrogen peroxide was initiated. The hydrogen peroxide solution was introduced at feed rates of 4.5 l/hr for the first 2 hours, 2.25 l/hr for the next 1 hour, 1.29 l/hr for the next 1 hour, and 1.12 l/hr thereafter, from a feed opening provided in the upper part of the polymerization apparatus.

Simultaneously with the introduction of hydrogen peroxide solution, the remaining vinyl chloride monomer weighing 427.5 kg was introduced into the polymerization apparatus from a lower part of the apparatus through a pipe having an inner diameter of 4 mm, in accordance with vinyl chloride monomer addition rates obtained from a conversion-to-polymer curve predicted beforehand. Thus, polymerization was allowed to proceed.

During the polymerization, the latex was sampled every hour, and the rate of additionally introducing vinyl chloride monomer was corrected so that the amount of the vinyl chloride present in the apparatus was regulated at 15 to 20% based on the total amount of all the vinyl chloride monomer introduced and to be introduced (450 kg).

Further, 40.5 liters of a 5% aqueous solution of sodium dodecylbenzenesulfonate was introduced into the polymerization apparatus at a constant rate of 9 l/hr from the time when 1.5 hours had passed from the initiation of polymerization to the time when 6 hours passed from the initiation of polymerization.

The circumferential speed of the agitating element during polymerization was 0.21 m/sec. The condenser was used from the time when 30 minutes had passed from the initiation of the addition of the polymerization initiator to the time when the amount of the vinyl chloride monomer which was condensed became small (until the conversion to polymer reached 85% or more).

The vinyl chloride monomer condensed during the use of the condenser was returned to the part above a surface of the reactant mixture in the polymerization apparatus through a nozzle.

Eight hours after the start of the polymerization, feeding of hydrogen peroxide was stopped and the vinyl chloride monomer remaining unreacted was recovered.

EXAMPLE 13

Polymerization was conducted in the same manner as in Example 12 except that 45 kg of vinyl chloride monomer (10% of the total amount to be introduced) was first introduced, that the remaining monomer weighing 405 kg was additionally introduced in such a manner that the amount of the unreacted monomer present in the polymerization system was regulated at 20 to 25% based on the total amount of the monomer introduced and to be introduced, and that the circumferential speed of the agitating element during polymerization was 0.64 m/sec.

EXAMPLE 14

Polymerization was conducted in the same manner as in Example 13 except that 113 kg of vinyl chloride monomer (25% of the total amount to be introduced) was first introduced, and that the remaining monomer weighing 337 kg was additionally introduced in such a manner that the amount of the unreacted monomer present in the polymerization system was regulated at 25 to 30% based on the total amount of the monomer introduced and to be introduced.

COMPARATIVE EXAMPLE 10

Polymerization was conducted in the same manner as in Example 13 except that 450 kg of vinyl chloride monomer (the whole amount to be introduced) was introduced into the polymerization apparatus at one time before polymerization and the additional incorporation of vinyl chloride monomer during polymerization was omitted.

COMPARATIVE EXAMPLE 11

Polymerization was conducted in the same manner as in Example 12 except that 450 kg of vinyl chloride monomer (the whole amount to be introduced) was introduced into the polymerization apparatus at one time before polymerization and the additional incorporation of vinyl chloride monomer during polymerization was omitted, and that the circumferential speed of the agitating element during polymerization was 1.67 m/sec.

COMPARATIVE EXAMPLE 12

Polymerization was conducted in the same manner as in Example 13 except that 180 kg of vinyl chloride monomer (40% of the total amount to be introduced) was first introduced into the polymerization apparatus, and that the remaining monomer weighing 270 kg was additionally introduced in such a manner that the amount of the unreacted monomer present in the polymerization system was regulated at 40 to 50% based on the total amount of the monomer introduced and to be introduced.

COMPARATIVE EXAMPLE 13

Polymerization was conducted in the same manner as in Example 13 except that 22.5 kg of vinyl chloride monomer (5% of the total amount to be introduced) was first introduced into the polymerization apparatus, and that the remaining monomer weighing 427.5 kg was additionally introduced in such a manner that the amount of the unreacted monomer present in the polymerization system was regulated at 5 to 10% based on the total amount of the monomer introduced and to be introduced.

The results obtained in Examples 12 to 14 and Comparative Examples 10 to 13 are summarized in Table 4.

TABLE 4

| | Feeding method for VCM | | | | | | | Scale amount | |
|---|---|---|---|---|---|---|---|---|---|
| | Feed Operating | VCM fed before polymerization (%) | Unreacted VCM during polymerization (%) | Circumferential speed of agitator (m/sec) | ε (%) | ΔT (°C.) | Conversion (%) | Adherent (kg) | Floating (kg) |
| Example 12 | Lower part | 5 | 15–20 | 0.21 | 95 | −0.4 | 89 | 0.13 | 0.21 |
| Example 13 | Lower part | 10 | 20–25 | 0.64 | 100 | −0.1 | 93 | 0.24 | 0.20 |
| Example 14 | Lower part | 25 | 25–30 | 0.64 | 98 | −0.2 | 92 | 0.20 | 0.18 |
| Comparative Example 10 | Upper part | 100 | —(*) | 0.64 | 60 | −4.2 | 58 | 0.32 | 0.29 |
| Comparative Example 11 | Upper part | 100 | —(*) | 1.67 | 100 | −0.1 | 88 | 0.48 | 0.45 |
| Comparative Example 12 | Lower part | 40 | 40–50 | 0.64 | 62 | −4.0 | 75 | 0.20 | 0.22 |
| Comparative Example 13 | Lower part | 5 | 5–10 | 0.64 | 97 | −0.2 | 79 | 0.15 | 0.20 |

Remarks
(*): No monomer was added during polymerization.

While the invention has been described in detail and with reference to specific embodiments thereof, it will be apparent to one skilled in the art that various changes and modifications can be made therein without departing from the spirit and scope thereof.

What is claimed:

1. In a batch-wise process for a microsuspension polymerization of vinyl chloride using a polymerization apparatus equipped with an agitator the improvement where a ratio (H/D) of an effective height (H) of the apparatus to an effective inner diameter (D) of the apparatus is at least 4, and the ratio (d/D) of the circumferential diameter (d) of an agitating element of the agitator to the effective inner diameter (D) of the polymerization apparatus is 0.7 to 0.9.

2. The process of claim 1 wherein the ratio (H/D) is 5 to 15.

* * * * *